United States Patent
van den Berg et al.

(10) Patent No.: US 9,162,818 B2
(45) Date of Patent: Oct. 20, 2015

(54) MODULAR CONVEYOR MAT AND CONVEYOR PROVIDED WITH A MODULAR CONVEYOR MAT

(71) Applicants: Joost Martinus van den Berg, 's-Gravenzande (NL); Cornelis Hendrik Mijndert Menke, 's-Gravenzande (NL)

(72) Inventors: Joost Martinus van den Berg, 's-Gravenzande (NL); Cornelis Hendrik Mijndert Menke, 's-Gravenzande (NL)

(73) Assignee: REXNORD FLATTOP EUROPE B.V., Gravenzande (NL)

( * ) Notice: Subject to any disclaimer, the term of this patent is extended or adjusted under 35 U.S.C. 154(b) by 0 days.

(21) Appl. No.: 14/359,893

(22) PCT Filed: Nov. 23, 2012

(86) PCT No.: PCT/NL2012/050833
§ 371 (c)(1),
(2) Date: May 21, 2014

(87) PCT Pub. No.: WO2013/077734
PCT Pub. Date: May 30, 2013

(65) Prior Publication Data
US 2014/0318932 A1  Oct. 30, 2014

(30) Foreign Application Priority Data
Nov. 24, 2011 (NL) .................................. 2007860

(51) Int. Cl.
*B65G 17/08* (2006.01)
*B65G 15/32* (2006.01)
(Continued)

(52) U.S. Cl.
CPC ............... *B65G 15/32* (2013.01); *B65G 17/06* (2013.01); *B65G 17/08* (2013.01); *B65G 2207/10* (2013.01); *B65G 2207/22* (2013.01); *B66B 23/08* (2013.01)

(58) Field of Classification Search
CPC ..... B65G 17/06; B65G 17/08; B65G 2207/10; B66B 23/08
USPC .......................... 198/321, 850, 851, 852, 853
See application file for complete search history.

(56) References Cited

U.S. PATENT DOCUMENTS 3,672,488 A   6/1972 Collins
5,964,339 A * 10/1999 Matsuura et al. ........ 198/810.03
(Continued)

FOREIGN PATENT DOCUMENTS

EP  0 063 533 A1  10/1982
EP  0 175 483 B1   6/1989
(Continued)

OTHER PUBLICATIONS

International Search Report and Written Opinion under date of Feb. 19, 2013 in connection with PCT/NL2012/050833.

*Primary Examiner* — Leslie A Nicholson, III
(74) *Attorney, Agent, or Firm* — Quarles & Brady LLP (57) ABSTRACT

Modular conveyor mat (1), comprising a number of rows (2) of modules (3), successive in the conveying direction (P) of the conveyor mat, which modules are provided with a body part (4) from plastic extending transversely to the conveying direction, which is provided with an upper surface (5), and which is provided, viewed in conveying direction, at the front (8) and rear (9) with a series of coupling elements (11) spaced apart with mutual interspaces (10). Coupling elements and interspaces of modules successive in conveying direction interdigitate, and are hingedly coupled with the aid of pins (12). The conveyor mat is provided with reinforcing strips (14) included in the body parts of the modules, spaced apart at a mutual intermediate distance transversely to the conveying direction, which extend in conveying direction between successive hinge pins, and which are provided adjacent their ends (15) with recesses (16) in which the hinge pins successive in conveying direction are received. The reinforcing strips extend at least locally through the upper surface of the modules and form a grid (20) of discharge contacts (18). The reinforcing strips and the hinge pins are manufactured from electrically conductive material, and form an electrically frame for carrying off electrostatic charge.

17 Claims, 5 Drawing Sheets

(51) Int. Cl.
   *B65G 17/06*   (2006.01)
   *B66B 23/08*   (2006.01)

(56) References Cited

U.S. PATENT DOCUMENTS

| | | | |
|---|---|---|---|
| 6,161,685 A * | 12/2000 | Stebnicki ...................... | 198/851 |
| 6,247,582 B1 * | 6/2001 | Stebnicki et al. ............. | 198/850 |
| 7,360,643 B1 | 4/2008 | Fandella | |
| 8,356,708 B2 * | 1/2013 | Andersen ...................... | 198/853 |

FOREIGN PATENT DOCUMENTS

| | | |
|---|---|---|
| EP | 1 468 943 A2 | 10/2004 |
| EP | 1 705 198 A1 | 9/2006 |
| EP | 2 157 035 A1 | 2/2010 |
| EP | 2 157 036 A1 | 2/2010 |
| WO | 99/65801 A1 | 12/1999 |
| WO | 2008/113194 A1 | 9/2008 |

\* cited by examiner

MODULAR CONVEYOR MAT AND CONVEYOR PROVIDED WITH A MODULAR CONVEYOR MAT

CROSS-REFERENCE TO RELATED APPLICATIONS

This application represents the national stage entry of PCT International Application No. PCT/NL2012/050833 filed Nov. 23, 2012, which claims the benefit Netherlands Patent Application 2007860, filed on Nov. 24, 2011, the disclosures of which are incorporated herein by reference in their entirety for all purposes.

The invention relates to a modular conveyor mat provided with modules from plastic material, and a conveyor provided with a modular conveyor mat.

Modular conveyor mats and conveyors provided with modular conveyor mats are generally known, and are used for conveying objects, such as discrete products, through a production environment. Usually, this involves conveyance of products with the aid of an endless conveyor mat along a conveyor track of a few tens of meters at a maximum, whereby the length of the conveyor mat is approximately twice the length of the conveyor track. The modules can be cost-effectively manufactured from relatively low-priced plastic material, for instance, by injection moulding. Usually, in each row transverse to the conveying direction, multiple modules are located next to each other, and the modules of rows successive in conveying direction are staggered relative to each other, as in the bricklaying pattern.

An advantage of modular conveyor mats is that through their modular structure they can be simply assembled to the desired length and width, and that any damaged or worn parts of the conveyor mat can be replaced relatively simply. Furthermore, a modular conveyor mat can be relatively lightweight, the conveyor track can be relatively compact, and the drive can be of relatively simple design using sprocket wheels.

A disadvantage of a modular conveyor mat, however, is that the plastic material of the modules can easily be electrostatically charged. In particular, through contact friction, the plastic upper surface of the modules can very easily obtain a locally high potential, which thereupon does not automatically dissipate anymore, due to the insulating property of the plastic material. When the conveying surface formed by the upper surfaces of the modules has to be accessible to persons, this can lead to hazardous situations when, for instance, via shoe soles a charge concentration is created on the upper surface of the modules, which then discharges via the feet as an electric shock through the body of the person towards an object having a lower potential. When, for instance, cars or other capital goods are placed on the conveying surface of the modular conveyor, which are being worked by persons moving along with the conveyor mat, chances are that via the persons' feet electric shocks are transmitted to the cars when the persons touch the cars. This can derange or even damage the electronics in the cars or the other capital goods, and may in extreme cases even be hazardous to the health of the persons on the conveyor mat.

It is possible to provide the plastic material with an additive to counteract electrostatic charging, for instance, graphite. This raises costs, and reduces the tensile strength of the plastic material, as a consequence of which more material is required. When, furthermore, additional requirements are set on the modules, for instance, in the area of flame retardancy, this precludes the use of the customary, low-priced technical plastics for the mat module, because the strength properties of the material fall short then.

In practice, this makes it impossible, for instance, to use modular conveyor mats in person-accessible conveyors with conveyor tracks of, for instance, more than 50 or 100 m, and with traveling speeds of, for instance, less than 10 or 5 meters per minute. Conveyors that do suit this purpose, for instance, roller chains with steel slats, or steel wire-reinforced endless rubber mats, have a structure that is modular only to a limited extent, and require a relatively complex conveyor track and/or drive.

The invention contemplates a modular conveyor mat and a conveyor provided therewith, whereby the drawbacks mentioned can be obviated while the advantages mentioned are maintained. In particular, the invention contemplates a cost-effective modular conveyor mat with plastic modules and a conveyor provided with a modular conveyor mat, with which powerful electric shocks resulting from electrostatic discharge can be avoided. To that end, the invention provides a modular conveyor mat, comprising a number of rows of modules, successive in a conveying direction of the conveyor mat, the modules being provided with a body part from plastic material extending transversely to the conveying direction, the body part being provided with an upper surface for carrying objects to be conveyed, and being provided, viewed in conveying direction, at the front and rear with a series of coupling elements spaced apart with mutual interspaces, while coupling elements and interspaces of modules successive in conveying direction interdigitate, and are hingedly coupled with the aid of pins extending transversely to the conveying direction through the coupling elements, wherein the conveyor mat is provided with reinforcing strips included in the body parts of the modules, spaced apart transversely to the conveying direction at a mutual intermediate distance, which extend in the conveying direction between successive hinge pins, and which are provided at their ends with recesses in which the hinge pins successive in conveying direction are received, wherein the reinforcing strips extend at least locally through the upper surface of the modules and form a grid of discharge contacts, and wherein the reinforcing strips and the hinge pins are manufactured from electrically conductive material and together form an electrically conductive frame for carrying off electrostatic charge.

By the use of plastic body parts provided with reinforcing strips which extend through the upper surface of the body parts, forming a grid of discharge contacts, and which, together with the hinge pins, form an electrically conductive frame, the frame can provide for both tensile strength and electrostatic dissipation, while the body parts can be manufactured from relatively low-priced, optionally flame-retardant plastic material, on which further no stringent requirements need to be set in the area of electrostatic dissipation or tensile strength. Persons standing on the conveyor mat and standing on a charged area on the upper surface of the module can then allow the charge to be dissipated in a controlled manner by making contact, with the help of footwear having electrically conductive soles, with the discharge contacts of the grid. Such footwear is known to the skilled person as ESD footwear, and is commercially available via, for instance, Bata shoes (http://www.esdproducts.eu/nl/nieuws/p/detail/esd-veiligheidsschoenen-batashoenen). In the grid of discharge contacts, the pitch between the discharge contacts both in the conveying direction and transversely thereto is less than or equal to about 6 inches (about 152 mm), so that the maximum build-up of charge is lower than 500 V when ESD shoes are worn of a shoe size 37 to 46. Elegantly, the pitch is less than or equal to about 3 inches (76 mm), so that the build-up of charge is lower than 100 V. With a maximum pitch of 3 inches, the sole of an ESD shoe is virtually always in contact with one or more discharge contacts, regardless of the position and orientation of the sole in horizontal stance on the conveying surface.

Electrically conductive contact between the hinge pins and reinforcing strips of the frame can be ensured under the influence of the tensile force exerted on the conveyor mat.

By the use of the reinforcing strips, the conveyor mat can be stiffer, so that in the case of longer conveyors such as people movers it is not necessary anymore, depending on the season, to take rows of modules out of the mat or re-place them when the temperature in summer is higher than in winter.

By coupling the reinforcing strips directly to the body parts so that they form a subassembly therewith, it can be achieved that the body parts together with the reinforcing strips can be included in the mat as modules, so that in assembling the mat, only the subassemblies, as structural elements, need to be coupled with the pins. By aligning in such a subassembly the holes or recesses in the reinforcing strips with the holes or recesses of the coupling elements, it can be achieved that coupling of the subassemblies can be further simplified. The reinforcing strips may be detachably connected to the body parts through clamping or via a snap connection, for instance in slots or recesses which are provided in the body parts. Optionally, the reinforcing strips may be non-detachably connected to the body parts, for instance by including them as inserts in the mould in manufacturing the body parts.

By coupling the body parts with each other via coupling elements, it can be achieved that the conveyor mat forms a whole, so that the body parts, for instance, cannot easily disengage unintentionally from the mat, and can contribute to the transmission of forces. The coupling elements may be provided with hinge holes which enclose the hinge pins, but may also be provided with slotted recesses in which the hinge pins can be snapped or clamped. The recesses at the ends of the reinforcing strips may also be implemented as such hinge holes or slotted openings.

By providing the reinforcing strips at an upper edge with projections which extend through recesses in the upper surface of the body part, it can be achieved that the upper surface of the body parts is further substantially closed, and/or that the reinforcing strips are well embedded in the upper surface of the body parts. Per reinforcing strip, there may be provided two or more projections, each surrounded by plastic material. The projections may extend through the upper surface by a few tenths of mm, e.g., 0.2 or 0.3 mm, or a few mm, e.g., 1 or 2 mm. In such a case, the projections can more easily make contact with the soles of the ESD footwear of persons present on the conveying surface of the conveyor mat, to thus augment the reliability of the electrostatic dissipation. Such jutting projections can further increase the skid resistance of the conveyor mat, so that the goods and/or persons to be conveyed have more grip. It is noted that the upper surface of the body part may optionally be provided with further projections, such as, for instance, teardrops or studs. Besides this and/or in addition to this, the upper surface of the body part may for instance be further provided with grooves, for instance for cooperation with transfer fingers, and/or with blind holes or through-holes.

By manufacturing the reinforcing strips and/or the hinge pins from electrically conductive metal, for example steel, a good stiffness and strength can be combined with good electrically dissipative properties at a reasonable price. Alternatively, the reinforcing strips and/or the hinge pins can be manufactured, for instance, from material with electrically conductive fibers, for example, carbon fiber-reinforced plastic material.

By having ends of reinforcing strips successive in conveying direction overlap, and furthermore providing between the coupling elements additional interspace for receiving the overlapping ends of the reinforcing strips, a good transmission of forces in the mat can be realized. The reinforcing strips can then have a thickness transversely to the conveying direction, adjacent the ends, that corresponds to half the width of a coupling element transversely to the conveying direction, so that the overlapping reinforcing strips are just as thick as a coupling element. The reinforcing strips can for instance have a thickness of about 3 mm. The reinforcing strips, viewed transversely to the upper surface of the module, can have a height that is greater than the height of the body parts, for instance when they extend out of the body part at the top and bottom. The reinforcing strips may for instance be manufactured from plate material, and can optionally be provided with staggered or bent parts, so that they deviate from the flat plane.

By having the reinforcing strips at a bottom side of the body part extend beyond the body part, it can be achieved that the conveyor mat is supported on the conveyor track via the reinforcing strips. This can augment the wear resistance of the conveyor mat, and can favourably influence the sliding properties of the conveyor mat. Lower edges of the reinforcing strips can then, for instance, jointly form a supporting surface of the conveyor mat for cooperation with a conveyor track. For carrying off electrostatic charge from the frame, the conveyor mat can be simply and reliably brought into electrically conductive contact with slide elements, such as wear strips or a wear plate from plastic material with electrically dissipative additive, such as PE with ESD properties. The wear strips or wear plates can then be connected to ground. Alternatively or additionally, the conveyor track, for carrying off electric charge from the frame of the conveyor mat, may be provided with grounded conductive contacts, such as brushes or strips, which make electrically conductive contact with the hinge pins or the underside of the mat.

By providing the body part transversely to the conveying direction with several spaced apart reinforcing strips, a relatively large subassembly which is light and strong can be provided. Elegantly, the reinforcing strips are placed transversely to the conveying direction at a distance from the side surfaces of the body part, so that the subassembly comes across as a conventional plastic mat module. Preferably, the intermediate distance between the stiffening strips is about 3 inches (about 76 mm).

As plastic material of the body part, for instance, injection mouldable thermoplastic technical plastics such as acetal, nylon, POM, PE, PP, or PVC can be chosen. The plastic material can for instance be provided with a flame-retardant agent, such as, for instance, a halide or red phosphorus. The plastic material may furthermore be free of agents that promote electrostatic dissipation. It is noted that within this context a flame-retardant plastic should be understood to mean a plastic material which is inherently flame-retardant, or which is provided with a flame-retardant additive. Within this context, a flame-retardant plastic material should be understood to mean a plastic material where, upon exposure to a particular heat flux, the propagation of a flame is less than a predetermined value as required in NEN-EN 13501-1 $Bf_{fl}$-S1.

The invention also relates to a conveyor, comprising an endless conveyor mat circulating between return elements, having an electrically conductive frame for carrying off electrostatic charge from the conveying surface, the frame being electrically conductively connected with the conveyor. The conveyor preferably has a conveyor track on which an underside of an upper run of the conveyor mat is slidingly supported. Thus, the conveyor track can be of relatively simple design. For the sliding support, for instance, relatively simple plastic slide elements, such as wear strips or slide plates, which are preferably of electrically conductive design, can suffice. For driving the conveyor mat, for instance, electromotor-driven sprocket wheels whose toothing engages the underside of the mat, for instance the hinge pins or the driving faces provided on the underside of the body parts of the modules, can suffice. A heavy foundation, or a deep shaft for concealing the drive is not necessary then.

It will be clear to the skilled person that the technical features of the present modular conveyor mat and conveyor elucidated in the above paragraphs can be advantageously used in a conveyor mat according to the main claim, not only each alone but also in any possible combination. The technical features described in the paragraphs can be isolated from the context, and the isolated technical features from the different paragraphs can be combined. Such combinations are herewith specifically disclosed in this description.

The invention will be further elucidated on the basis of a non-limiting exemplary embodiment, which is represented in the drawings. In the drawings.

It is noted that the Figures are only schematic representations of a preferred embodiment of the invention. In the Figures, identical or corresponding parts are represented with the same reference numerals.

Figure 1:
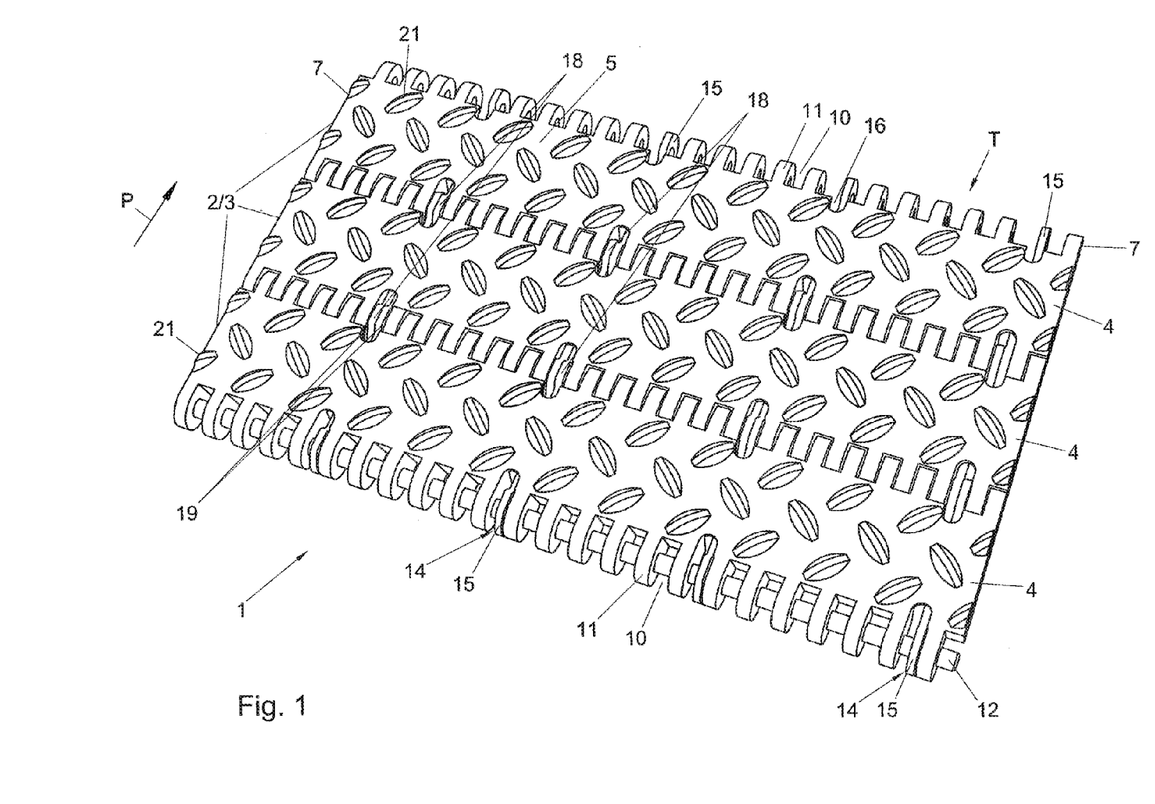
FIG. 1 shows a schematic perspective top plan view of a portion of a modular conveyor mat.

FIGS. 1-7 show an exemplary embodiment of a modular conveyor mat 1. In particular, FIG. 1 shows a portion of a modular conveyor mat 1. The conveyor mat 1 comprises a number of rows 2 of modules 3, successive in a conveying direction of the conveyor mat 1 indicated with an arrow P. In this example, only three successive rows are represented, and per row 2 transverse to the conveying direction P only one module per row 2 is represented. In practice, however, many successive rows 2 are present in the conveyor mat 1, and per row 2 transverse to the conveying direction multiple modules 3 may be located next to each other. The modules 3 of successive rows 2 may be staggered relative to each other transversely to the conveying direction P. In practice, successive rows 2 of the conveyor mat 1 are coupled to form an endless loop.

The conveyor mat 1 is usually included in a conveyor, and circulates therein between sprocket wheels. The conveyor mat then has an upper run moving between the return wheels in the conveying direction P, and a lower run moving back against the conveying direction. Body parts 4 of the modules 3 in the upper run are then supported on or at their undersurfaces 6 by a conveyor track, and upper surfaces 5 of the body parts 4 in the upper run together form a conveying surface T, on which, for instance, cars to be assembled can be placed.

Figure 2:
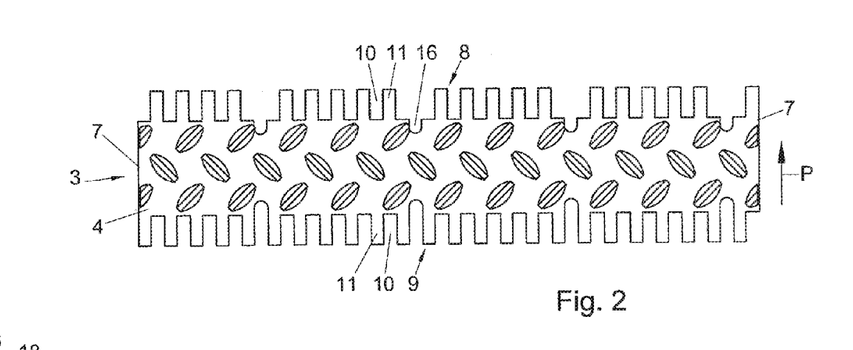
FIG. 2 shows a schematic top plan view of a module of the conveyor mat of FIG. 1.
Figure 3:
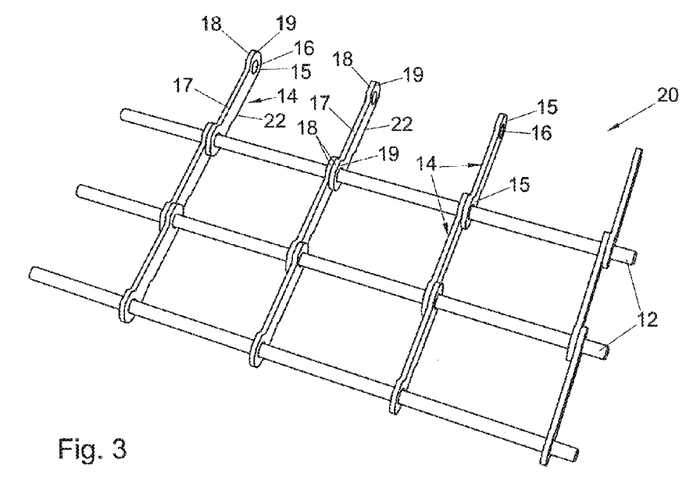
FIG. 3 shows a schematic perspective top plan view of the frame of reinforcing strips and hinge pins of the conveyor mat of FIG. 1.
Figure 4:
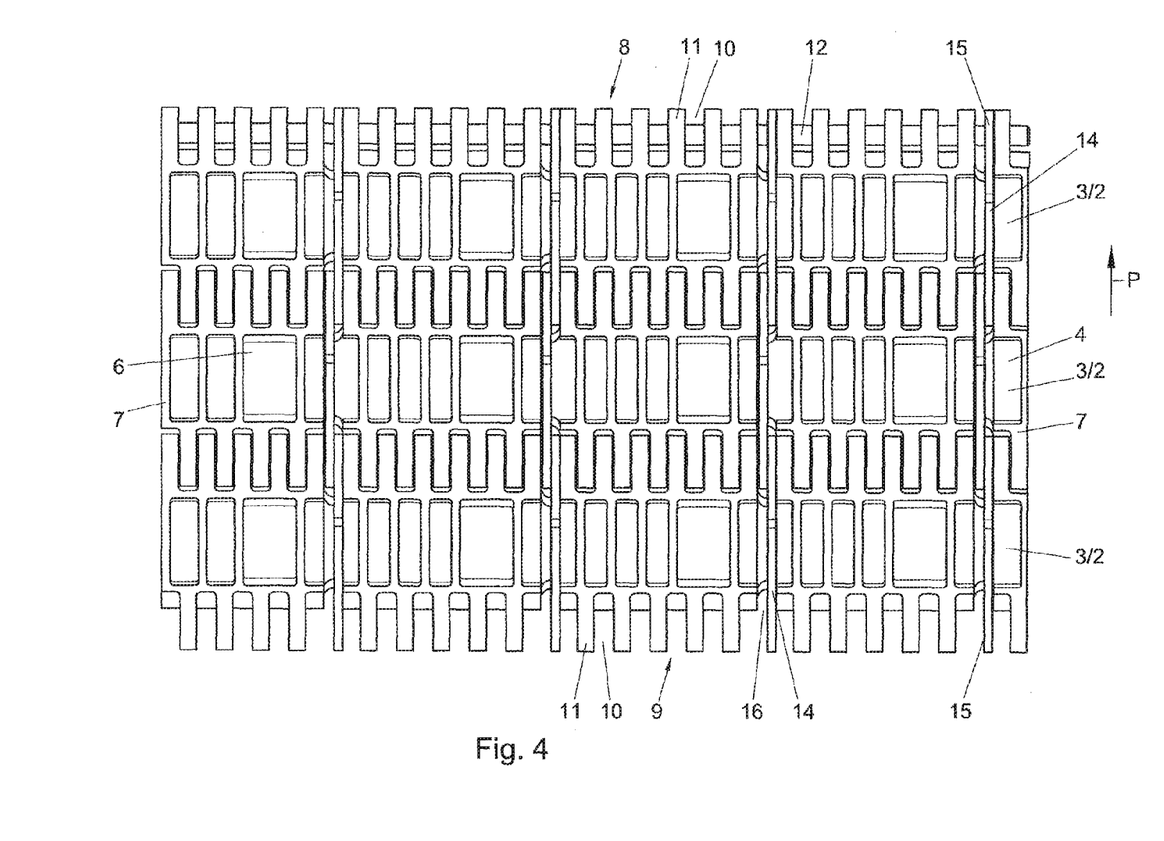
FIG. 4 shows a schematic bottom view of the conveyor mat of FIG. 1.
Figure 5:
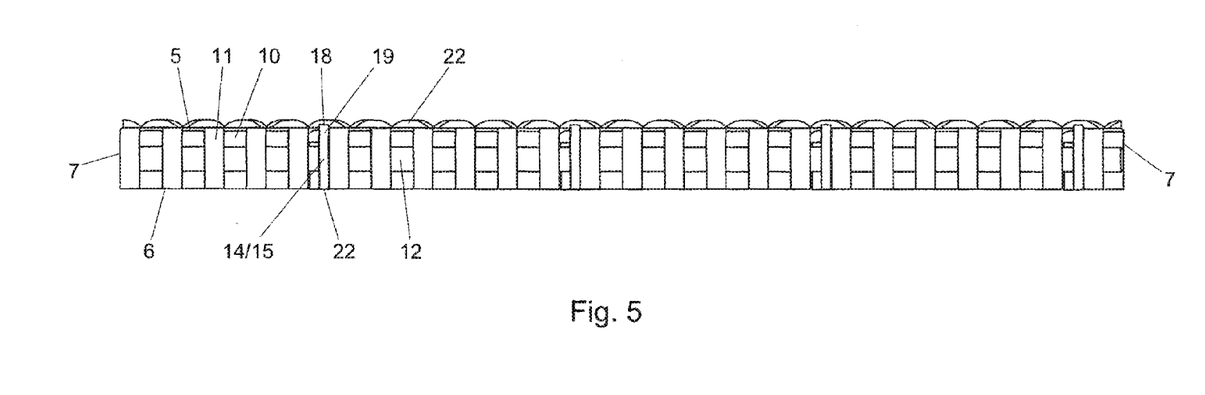
FIG. 5 shows a schematic front view of the conveyor mat of FIG. 1.
Figure 6:
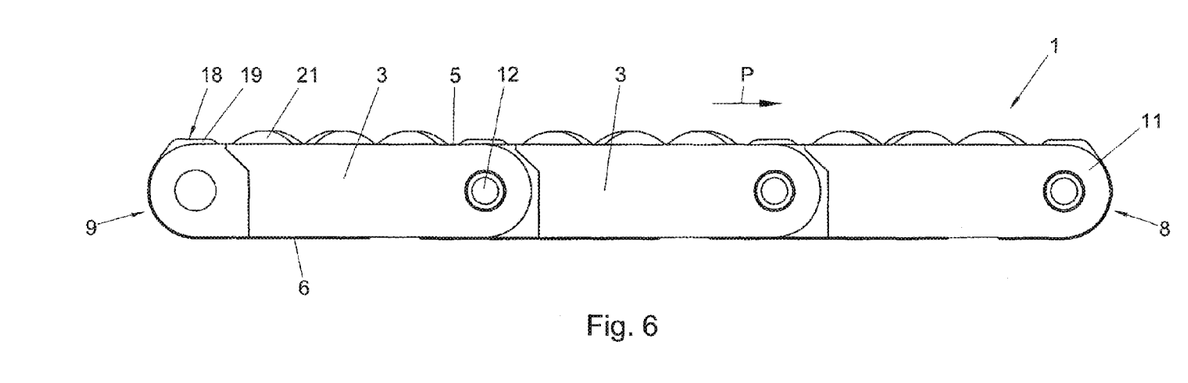
FIG. 6 shows a schematic side view of the conveyor mat of FIG. 1.
Figure 7:
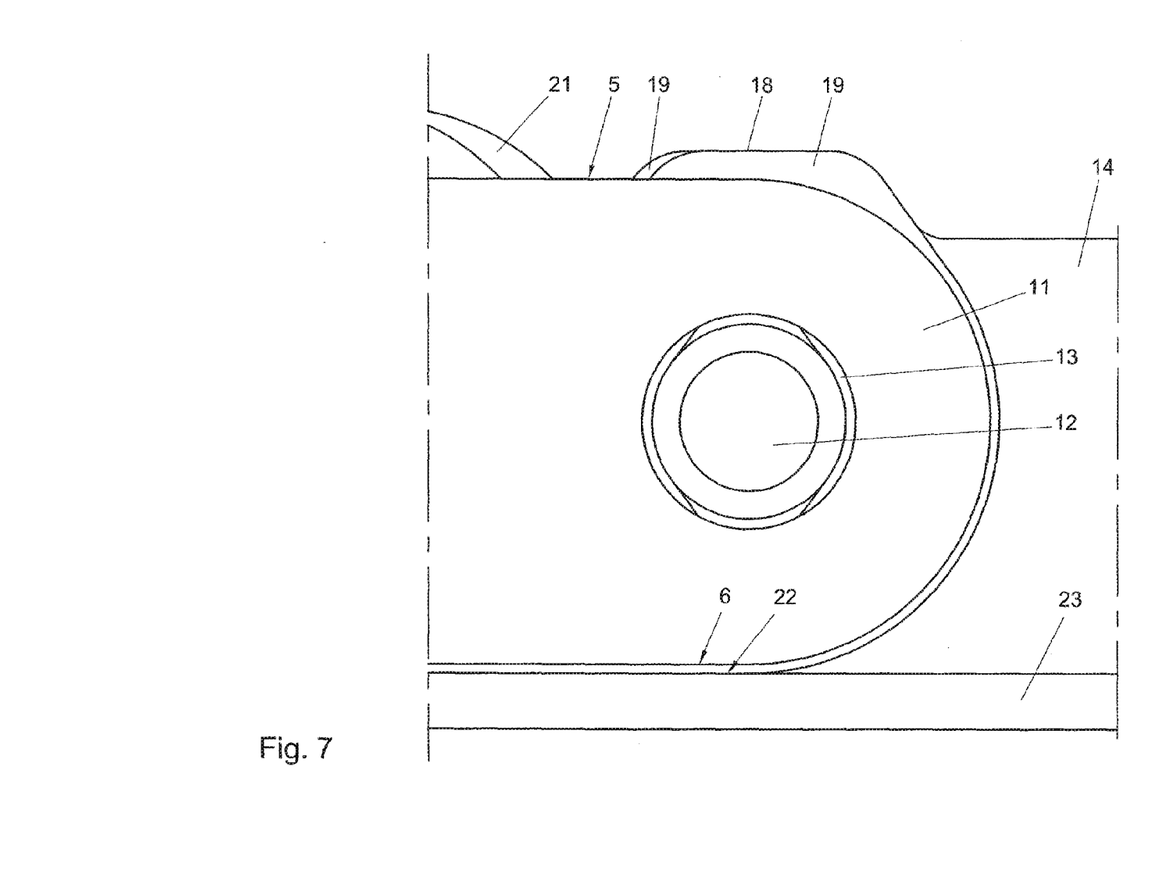
FIG. 7 shows a detail of FIG. 6.

In FIG. 2 it can be clearly seen that the modules 3 are provided with a body part 4 extending transversely to the conveying direction P. The body part 4 shown is manufactured by injection moulding from thermoplastic plastic without flame retardant, for instance PP. Also, a flame retardant may be used, for instance red phosphorus. The body part 4 is provided with an upper surface 5 for carrying objects to be conveyed. The body part is further provided with an undersurface 6. Furthermore, the body parts 4, seen transversely to the conveying direction P, are provided with side surfaces 7.

Viewed in conveying direction P, the body parts 4 are provided at a front 8 and a rear 9 with a series of coupling elements 11 spaced apart with mutual interspaces 10. Coupling elements 11 and interspaces 10 of modules 3 successive in conveying direction P interdigitate, and are coupled with the aid of hinge pins 12 extending transversely to the conveying direction P through the coupling elements. Modules 3 successive in conveying direction P can pivot relative to each other about the hinge pin 12, so that the conveyor mat 1 can pivot upward or downward from a planar path, for instance to pass around a sprocket wheel. In this exemplary embodiment, the coupling elements are designed as hinge loops with closed hinge holes 13 through which extend the hinge pins 12. Transversely to the conveying direction P, the hinge pins 12 can be designed to be continuous over the width of the conveyor mat 1, but the hinge pins 12 can also be designed in successive parts. Near side edges of the conveyor mat 1, the hinge pins can be retained with retaining provisions, such as, for instance, locking clips. In this exemplary embodiment, the hinge pins are manufactured from stainless steel rod stock.

The conveyor mat 1 is provided with reinforcing strips 14 spaced apart at mutual intermediate distances, transversely to the conveying direction P, included in the body parts 4 of the modules 3. In this example, each body part 4 hence comprises several spaced apart reinforcing strips 14 transversely to the conveying direction P.

The reinforcing strips 14 in this example are stamped from stainless steel plate material. The reinforcing strips 14 extend in conveying direction P between successive hinge pins 12. The reinforcing strips 14 are further provided at their ends 15 with recesses 16 in which the hinge pins 12 successive in conveying direction P are received. The recesses 16 are here formed by holes that enclose the hinge pins 12. The reinforcing strips 14 extend at least locally through the upper surface 5 of the modules 3, and form discharge contacts 18.

The projecting parts of the reinforcing strips 14 together form a grid of discharge contacts 18 in the conveying surface T. In the exemplary embodiment shown, the pitch between the discharge contacts is less than or equal to about 3 inches (about 76 mm). Upon walking or turning on the conveying surface T of the conveyor mat 1 of the exemplary embodiment with an ESD shoe of shoe size 37-46, even when the body parts of the modules are designed in POM, the maximum potential between the discharge contact and a charged point on the conveying surface T, that is carried off via the electrically conductive sole of the ESD shoe has been experimentally established to be less than 100 Volts (about 5-20 Volts). In the example, the pitch transversely to the conveying direction is about 3 inches (76 mm), and the pitch in the conveying direction about 2.25 inches (57 mm). In the exemplary embodiment shown, the reinforcing strips 14 are provided at their upper edges 17 with projections 19 which extend through the upper surface 5 of the module 3 by, for instance, about 1 mm. The tops of the projections then form the discharge contacts 18. This is clearly visible in FIGS. 5-7. Projection through the upper surface 5 of the module occurs at an interspace 10 between adjacent coupling elements 11, and in this example furthermore at a supplemental recess 16 provided in upper surface 5 of the body part 4. The ends 15 of reinforcing strips successive in conveying direction P overlap. The supplemental recess 16 forms an additional interspace for receiving the overlapping ends of the reinforcing strips. The reinforcing strips 14 and the hinge pins 12 of stainless steel are electrically conductive, and together form an electrically conductive frame 20 for dissipating, with the aid of the discharge contacts 18, electrostatic charge which is built up in the upper surfaces 5 of the modules 3 by contact friction. For the sake of clarity, the frame 20 is represented separately in FIG. 3. Because the discharge contacts 18 and the electrically conductive frame 20 are provided, the plastic material in this example is free of any agents for promoting electrostatic dissipation (ESD). The upper surfaces 5 of the body parts 4 of the modules 3 are furthermore provided with teardrops 21 to augment grip on the conveying surface T.

The reinforcing strips 14 are coupled directly to the body parts 4 and form a subassembly with them. In the absence of the hinge pins 12, the reinforcing strips 14 and the body parts 4 of the modules 3 hence form a unit, so that assembly of the conveyor mat 1 is considerably simplified. In the exemplary embodiment shown, the projections 19 clasp the central portion of the body part 4, so that they remain stuck to the body part 4.

In this exemplary embodiment, near the undersurface 6 of the body part 4, the reinforcing strips 14 extend beyond the body part 4 by, for instance, about 0.2 mm. This can be seen in FIG. 7. Lower edges 22 of the reinforcing strips 14 then jointly form a supporting surface for cooperation with a conveyor track. Here, the reinforcing strips 14 hence extend through both the upper surface 5 and the undersurface 6 of the body part 4 of the modules 3. Viewed transversely to the upper surface 5 of the module 3, the reinforcing strips 14 hence have a height that is greater than the height of the body part 4.

The conveyor mat 1 of FIGS. 1-7 is built into a conveyor, not represented, in which it circulates as an endless loop between return wheels. An upper run of the conveyor mat moving in the conveying direction between the return wheels is then supported slidingly, via the lower edges 22 of the reinforcing strips 14, on electric charge dissipative or electrically conductive, flame-retardant plastic slide plates 23 (FIG. 7) of a conveyor track. The slide plates are connected to ground. The upper run of the conveyor mat 1 is, for instance, 150 m long and 4 m wide, and is driven via sprocket wheels to travel at a speed of about 5 meters per minute. On the conveying surface T formed by the upper run of the conveyor mat 1 are cars to be worked. The conveying surface T is accessible to persons. Electrostatic charge that is built up, for instance, by the car wheels or by friction with shoe soles on the upper surface of the modules, is carried off, upon entry of the mat with ESD shoes, by way of the sole of the shoe through contact with the discharge contacts via the frame and the slide plate. The electrostatic charge hence cannot as a high-voltage shock flash over to the car via the person, and the electronics present in the car is thus protected.

As for the scope of this disclosure, it is pointed out that technical features which have been specifically described may be susceptible of a functional generalization. Furthermore, it is pointed out that—as far as not explicitly indicated—such technical features can be seen separately from the context of the given exemplary embodiment, and furthermore can be seen separately from the technical features with which they cooperate in the context of the example.

As for the scope of protection, it is pointed out that the invention is not limited to the exemplary embodiment represented here, and that many variants are possible. For instance, the basic shape of the modules and of the strips can be chosen differently, and the conveyor mat may be designed, for instance, as a so-called flexmat in which modules successive in conveying direction can pass through a bend in the conveying surface. Further, the number of contact points per reinforcing strip may vary, and the reinforcing strip can extend through the upper surface of the module in more or fewer places. Such variants will be clear to the skilled person and are understood to fall within the scope of the invention as set forth in the following claims.

LIST OF REFERENCE NUMERALS

1. Conveyor mat
2. Row
3. Module
4. Body part
5. Upper surface
6. Undersurface
7. Side surface
8. Front
9. Rear
10. Interspace
11. Coupling element
12. Hinge pin
13. Hinge hole
14. Reinforcing strip
15. End
16. Recess
17. Upper edge
18. Discharge contact
19. Projection
20. Frame
21. Teardrop
22. Lower edge
23. Slide element
P Conveying direction
T Conveying surface

The invention claimed is:
1. A modular conveyor mat, comprising:
a number of rows of modules, successive in a conveying direction of the conveyor mat, at least one of the modules including a body part formed from plastic material and extending transversely to the conveying direction, said body part having a front and rear joined by an upper surface for carrying objects to be conveyed, a series of coupling elements extending from the front and rear are spaced apart with mutual interspaces and interdigitate with coupling elements and interspaces of adjacent modules, hinge pins extending through the coupling elements hingedly couple the plastic body part to the adjacent modules, reinforcing strips included in the body part are spaced apart transversely to the conveying direction at a mutual intermediate distance and extend in the conveying direction between successive hinge pins, ends of conveying direction are received, wherein the reinforcing strips extend at least locally through the upper surface and form part of a grid of discharge contacts, and wherein the reinforcing strips and the hinge pins are electrically conductive and together form an electrically conductive frame for carrying off electrostatic charge.

2. A modular conveyor mat according to claim 1, wherein the pitch between the discharge contacts is about 6 inches at a maximum.

3. A modular conveyor mat according to claim 1, wherein the reinforcing strips are coupled directly to the body parts and form a subassembly therewith.

4. A modular conveyor mat according to claim 1, wherein the reinforcing strips are provided at an upper edge with projections which extend through recesses in the upper surface of the body part.

5. A modular conveyor mat according to claim 1, wherein the strips and/or the hinge pins are manufactured from metal.

6. A modular conveyor mat according to claim 1, wherein the reinforcing strips near an underside of the body part extend beyond the body part.

7. A modular conveyor mat according to claim 1, wherein lower edges of the reinforcing strips jointly form a supporting surface of the conveyor mat for cooperation with a conveyor track.

8. A modular conveyor mat according to claim 1, wherein ends of reinforcing strips successive in conveying direction overlap, and wherein furthermore between the coupling elements additional interspace is provided for receiving the overlapping ends of the reinforcing strips.

9. A modular conveyor mat according to claim 1, wherein the body part includes several spaced apart reinforcing strips transversely to the conveying direction.

10. A modular conveyor mat according to claim 1, wherein the plastic material of the body part is flame-retardant.

11. A modular conveyor mat according to claim 1, wherein the plastic material is free of an additive for promoting electrostatic dissipation (ESD).

12. A modular conveyor mat according to claim 1, wherein the conveyor mat has a length of more than 100 m.

13. A conveyor, comprising an endless conveyor mat accessible to persons, circulating between return elements according to claim 1, wherein the conveyor mat is electrically conductively connected to ground via a conveyor track supporting the conveyor mat.

14. A conveyor according to claim 13, wherein at the upper run of the conveyor mat, the conveyor mat is supported via undersides of the reinforcing strips on slide elements of the conveyor track.

15. A conveyor according to claim 14, wherein the slide elements are of electrically conductive or electrostatically dissipative design.

16. A modular conveyor mat according to claim 1, wherein the body part is made of plastic material without flame retardant material.

17. A modular conveyor mat module comprising:
a body part formed from plastic material, said body part having a front and rear joined by an upper surface for carrying objects to be conveyed; a series of coupling elements extending from the front and rear are spaced apart with mutual interspaces for interdigitating with coupling elements and interspaces of adjacent modules;
hinge pins extending through the coupling elements hingedly couple the plastic body part to the adjacent modules; and
reinforcing strips included in the body part are spaced apart transversely to a conveying direction at a mutual intermediate distance and extend in the conveying direction between successive hinge pins, ends of said reinforcing strips include openings in which the hinge pins are received, wherein the reinforcing strips extend at least locally through the upper surface and form part of a grid of discharge contacts, and wherein the reinforcing strips and the hinge pins are electrically conductive and together form an electrically conductive frame for carrying off electrostatic charge.

* * * * *

UNITED STATES PATENT AND TRADEMARK OFFICE
CERTIFICATE OF CORRECTION

| | |
|---|---|
| PATENT NO. | : 9,162,818 B2 |
| APPLICATION NO. | : 14/359893 |
| DATED | : October 20, 2015 |
| INVENTOR(S) | : van den Berg et al. |

It is certified that error appears in the above-identified patent and that said Letters Patent is hereby corrected as shown below:

In the Specification

Column 7, line 48
"150 in" should be --150 m--

In the Claims

Column 8, line 61
"ends of conveying" should be --ends of said reinforcing strips include openings in which the hinge pins successive in conveying--

Signed and Sealed this
Twelfth Day of July, 2016

Michelle K. Lee
*Director of the United States Patent and Trademark Office*